United States Patent [19]
Theobald

[11] Patent Number: 6,089,585
[45] Date of Patent: Jul. 18, 2000

[54] TELESCOPICALLY COMPRESSIBLE WHEEL SUSPENSION

[75] Inventor: Markus Theobald, München, Germany

[73] Assignee: Bayerische Motoren Werke Aktiengesellschaft, Munich, Germany

[21] Appl. No.: 08/994,751

[22] Filed: Dec. 19, 1997

[30] Foreign Application Priority Data

Dec. 19, 1996 [DE] Germany ............... 196 53 148

[51] Int. Cl.⁷ .................................................. B62K 21/02
[52] U.S. Cl. .......................................................... 280/276
[58] Field of Search ................... 280/276, 277, 280/275

[56] References Cited

U.S. PATENT DOCUMENTS

| | | | |
|---|---|---|---|
| 598,186 | 2/1898 | Thompson | 280/276 |
| 680,048 | 8/1901 | Koch | 280/276 |
| 1,234,311 | 7/1917 | Duncan | 267/226 |
| 2,196,089 | 4/1940 | Wallace | 280/276 |
| 3,987,807 | 10/1976 | Varnell | 135/66 |
| 4,424,980 | 1/1984 | Tsukamoto et al. | 280/276 |
| 4,438,909 | 3/1984 | Matsumoto | 267/64.26 |
| 4,561,669 | 12/1985 | Simons | 280/276 |
| 4,601,302 | 7/1986 | Breen et al. | 135/66 |
| 4,609,202 | 9/1986 | Miyakoshi et al. | 280/276 |
| 4,795,009 | 1/1989 | Tanahashi et al. | 188/315 |
| 4,807,860 | 2/1989 | Simons | 267/217 |
| 4,834,222 | 5/1989 | Kato et al. | 188/280 |
| 4,834,223 | 5/1989 | Kawamura et al. | 188/282 |
| 4,964,625 | 10/1990 | Kawamura | 267/221 |
| 4,971,344 | 11/1990 | Turner | 280/276 |
| 5,088,705 | 2/1992 | Tsai | 267/226 |
| 5,158,161 | 10/1992 | Yamaoka et al. | 188/299 |
| 5,248,159 | 9/1993 | Moore | 280/276 |
| 5,449,155 | 9/1995 | Mack | 267/292 |
| 5,749,590 | 5/1998 | Roerig | 280/276 |
| 5,848,675 | 12/1998 | Gonzalez | 188/319.2 |

FOREIGN PATENT DOCUMENTS

| | | |
|---|---|---|
| 1 148 821 | 1/1956 | Germany . |
| 37 08 579 | 9/1988 | Germany . |
| 37 25 983 | 2/1989 | Germany . |
| 430193 | 12/1948 | Italy . |
| 2 296 902 | 7/1996 | United Kingdom . |

OTHER PUBLICATIONS

Kraftfahrzeugtechnik 9, 1972, p. 267.
Federung und Dampfung, Motorrad 19, 1975, p. 34.

*Primary Examiner*—Kevin Hurley
*Assistant Examiner*—Andrew J. Fischer
*Attorney, Agent, or Firm*—Evenson, McKeown, Edwards & Lenahan, P.L.L.C.

[57] ABSTRACT

A telescopically compressible wheel suspension, particularly for a front wheel of a motorcycle, having at least one standpipe and at least one slide pipe which are telescopically slidably guided inside one another in the axial direction via at least one slide bearing. The slide pipe and the standpipe are filled with oil and therefore form a lubricant container. In order to minimize the required amount of lubricant up to a defined level, a molded body is inserted into the slide and/or standpipe which, by means of at least one portion of its volume, displaces the lubricant, such as oil, to a level where lubrication is needed.

21 Claims, 2 Drawing Sheets

TELESCOPICALLY COMPRESSIBLE WHEEL SUSPENSION

BACKGROUND AND SUMMARY OF THE INVENTION

This application claims the priority of German Application No. 196 53 148.9 filed Dec. 19, 1996 in Germany, the disclosure of which is expressly incorporated by reference herein.

The invention relates to a telescopically compressible wheel suspension, particularly for a front wheel of a motorcycle.

German Patent Document DE 37 25 983 A1 describes a telescopic spring strut, particularly for front wheel forks of motorcycles or the like, having a standpipe which is constructed as an interior pipe and a slide pipe which is constructed as the exterior pipe and which surrounds the lower end of the standpipe, both pipes being slidably in the axial direction disposed in one another. The slide pipe forms a lubricant container for accommodating a lubricant which increases the slidability of the connection of the standpipe and the slide pipe during their axial displacement with respect to one another. For this purpose, the slide pipe is filled with a lubricant and the standpipe is pushed in, which results in a lubricant level in the standpipe which has the reference number 9.

This is necessary because the lubrication of the uppermost slide bearing between the standpipe and the slide pipe must be ensured in any operating condition. Thus, for example, the fork legs of motorcycle forks are filled with oil up to a corresponding level. This also applies to the fork legs of motorcycle forks in the case of which the slide pipe is guided by way of at least one trailing arm which is mounted to be swivellable about a frame-fixed transverse axis of the vehicle, this trailing arm being supported fixed to the frame by way of a spring strut.

Particularly for motorcycle forks which permit large spring travels and are stiff, and thus have a large length and diameter, high oil filling quantities are required in order to ensure the lubrication of the uppermost slide bearing. This raises the weight and the costs of the motorcycle fork. The weight increase has a particularly negative effect because the weight of the oil in the slide pipe is added to the unsprung masses of the motorcycle.

It is therefore an object of the invention to limit, in the case of a telescopically compressible wheel suspension, the amount of lubricant for the slide-bearing-disposed telescopic guiding between a standpipe and a slide pipe and thus save weight, particularly on unsprung parts.

According to the invention, this and other objects have been achieved by providing a telescopically compressible wheel suspension for a front wheel of a motorcycle, comprising at least one standpipe, at least one slide pipe, said standpipe and said slide pipe being telescopically slidable in one another in an axial direction via at least one slide bearing, at least one of said standpipe and said slide pipe defining an interior space for receiving a lubricant, and a molded body disposed in said interior space.

According to the invention, in the case of a telescopically compressible wheel suspension having at least one standpipe and one slide pipe which are telescopically slidably guided in one another in the axial direction via at least one slide bearing and form a lubricant container, a molded body is inserted at least in a partial area of the slide and/or standpipe where at least a portion of the lubricant is situated, which molded body reduces by means of at least a portion of its volume, the lubricant amount required up to a defined level.

The insertion of a molded body in the standpipe and/or slide pipe of a telescopically compressible wheel suspension has the advantage that the molded body, because of its volume, reduces the amount of lubricant, such as oil, which is required for reaching a defined level. If the specific weight of the molded body is lighter than that of the lubricant, the weight of the wheel suspension will be reduced. With a lower weight of the unsprung masses of the wheel suspension, the suspension and damping behavior of the wheel suspension and therefore the handling of the vehicle will improve.

The saving of oil reduces the costs if the price of the molded body is lower.

Among others, an embodiment of the invention is particularly advantageous in which the slide pipe is guided by way of at least one trailing arm which is linked to be swivellable about a frame-fixed transverse axis of the vehicle and which is supported fixed to the vehicle frame via a spring device and/or damping device. Such a wheel suspension, in the case of which the spring device and/or damping device, for example, a spring strut, is not integrated in the telescopic fork, has a very large volume in the standpipe and slide pipe which are telescopically guided inside one another. By inserting a molded body, for example, a hollow, tightly closed cylinder consisting of a tube closed on both sides, coaxially in the slide pipe, which cylinder extends into the standpipe, a large amount of lubricant can be saved. The molded body takes up a substantial portion of the volume of the interior space for lubricant, for example, at least 50% thereof, and preferably at least 75% thereof.

With the exception of a gap, which is required so that the standpipe can freely move in the slide pipe, the hollow space of the slide pipe is filled by the hollow molded body made of a plastic material and/or of aluminum. Now only a lubricant quantity, such as oil, must be filled in which fills in the space between the molded body and the slide pipe and standpipe. Since the hollow molded body has a lower specific weight than the oil, the wheel suspension as a whole will be lighter.

Other objects, advantages and novel features of the present invention will become apparent from the following detailed description of the invention when considered in conjunction with the accompanying drawings.

DETAILED DESCRIPTION OF THE DRAWINGS

Figure 1:
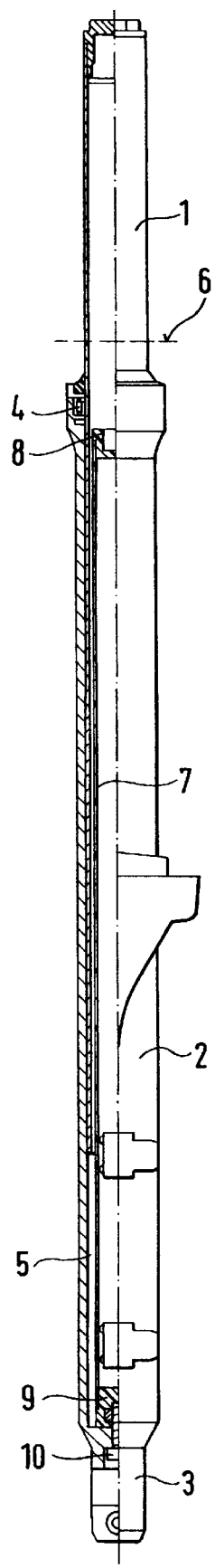
FIG. 1 is a partial sectional view of a telescopically compressible wheel suspension according to a preferred embodiment of the present invention consisting of a standpipe and a slide pipe.
Figure 2:
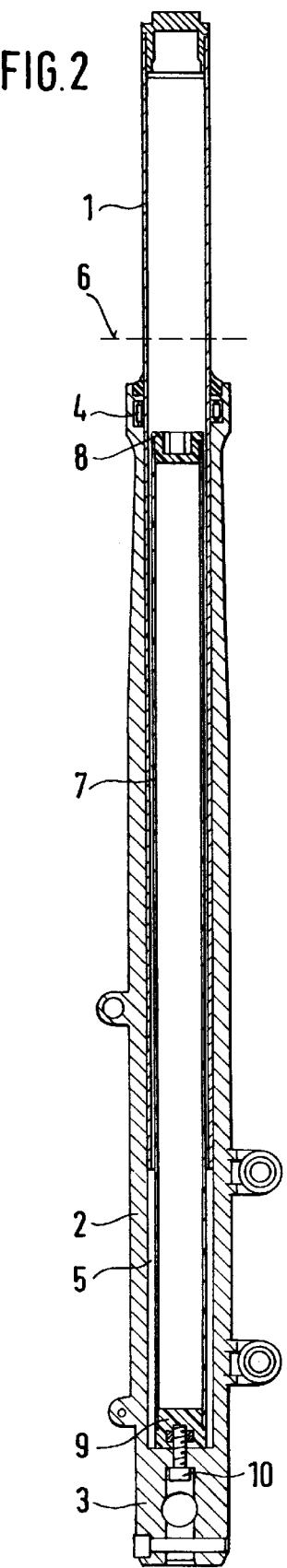
FIG. 2 is a cross-sectional view of the wheel suspension of FIG. 1.
Figure 3:
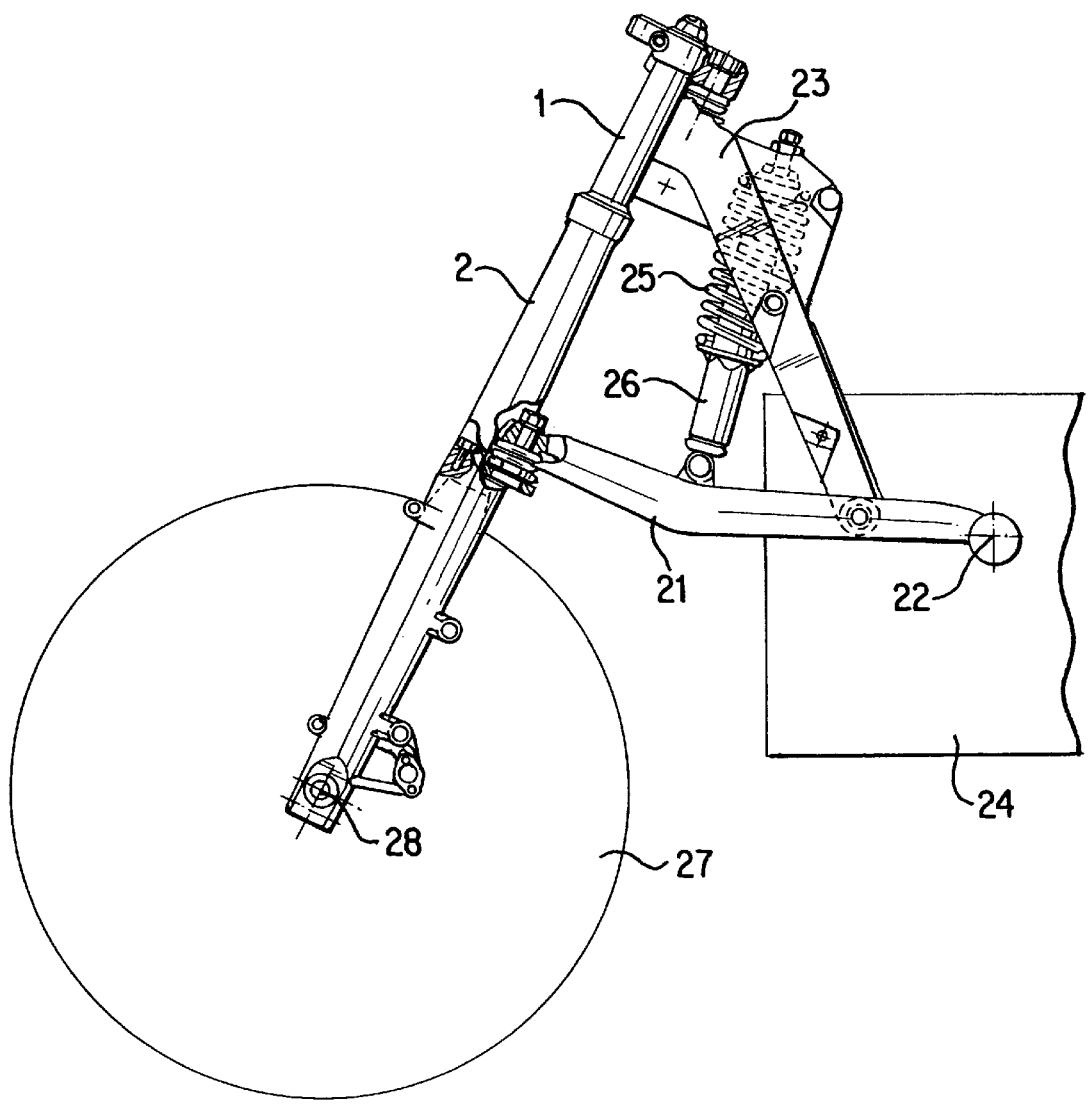
FIG. 3 is a side view of the front porion of a motorcycle including the wheel suspension of FIG. 1.

FIGS. 1–3 show a telescopically compressible wheel suspension consisting of a standpipe 1 and of a slide pipe 2. FIGS. 1 and 2 are rotated by 90° from each other. In the telescopic wheel suspension of this embodiment, the springy support and the damping for a front wheel 20, is not integrated in the standpipe 1 and/or slide pipe 2 but is implemented by way of other vehicle parts. For example, it the slide pipe 2 may be guided via a trailing arm 21 swivellably about a frame-fixed transverse axis 22 of the vehicle on the vehicle frame 23. The engine is represented schematically at 24. In this case, the flux of force can take place from the slide pipe 2 into the vehicle frame via a resilient support of the trailing arm on the vehicle frame, for example, by means of a spring strut arrangement including a spring 25 and a damper (or shock absorber) 26. The standpipe 1 and the slide pipe 2 will then transmit no forces in the axial direction on one another but only forces in the directions transversely to their longitudinal axis.

A front wheel 27 is fastened by means of its axle 28 in the lower area of the slide pipe 2 by way of an axle receiving device 3. The springing movement of the front wheel is achieved in that the standpipe 1 and the slide pipe 2 are telescopically slidably guided in one another. For this purpose, a slide bearing 4 is mounted for guiding the standpipe 1 in the slide pipe 2. For lubricating the slide bearing 4, the slide pipe 2 and the standpipe 1 are filled with oil 5 up to a level 6 indicated by a broken line.

For reducing the amount of oil required for reaching the level 6, a molded body is inserted in the standpipe 1 and the slide pipe 2. This molded body consists of a plastic pipe 7 whose ends are sealingly closed off by plastic bushes 8, 9. By way of the plastic bush 9, the plastic tube 7 is screwed on its lower end by means of a screw 10 to the slide pipe 2 in a coaxial and sealing manner. The plastic tube 7 extends approximately to the slide bearing 4 below the level 6. Because of the volume of the molded body, only a small amount of oil 5 must be filled in for reaching the level 6 because only the spaces between the plastic tube 7 and the slide pipe 2 and the standpipe 1 must be filled in. Since the slide pipe 2 and therefore the oil 5 are part of the unsprung masses of the wheel suspension, the saving of weight due to a lower density of the plastic tube 7 than the oil 5 has a particularly favorable effect on the vehicle handling.

Particularly in the case of a wheel suspension in which no spring elements and/or damper elements are contained in the standpipe 1 and/or slide pipe 2, the molded body can be designed to be so large that much oil 5 is saved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A telescopically compressible wheel suspension for a front wheel of a motorcycle, comprising:
    at least one standpipe;
    at least one slide pipe, said slide pipe being telescopically slidable in said standpipe in an axial direction via at least one slide bearing, at least one of said standpipe and said slide pipe defining an interior space for receiving a lubricant; and
    a molded body disposed in said interior space, said molded body being configured to take up at least 50% of said interior space, wherein the molded body is hollow and sealed.

2. A telescopically compressible wheel suspension according to claim 1, wherein the molded body is a hollow cylinder.

3. A telescopically compressible wheel suspension according to claim 2, wherein the hollow cylinder is a tube which is closed on both sides.

4. A telescopically compressible wheel suspension according to claim 1, wherein the molded body is mounted in the slide pipe.

5. A telescopically compressible wheel suspension according to claim 4, wherein the molded body is mounted coaxially with respect to the slide pipe.

6. A telescopically compressible wheel suspension according to claim 4, wherein the molded body extends into the standpipe.

7. A telescopically compressible wheel suspension according to claim 5, wherein the molded body extends into the standpipe.

8. A telescopically compressible wheel suspension according to claim 4, wherein the molded body extends inside the slide pipe to a location proximate and below the slide bearing.

9. A telescopically compressible wheel suspension according to claim 1, wherein the molded body consists of plastic.

10. A telescopically compressible wheel suspension according to claim 1, further comprising at least one trailing arm for guiding said slide pipe, which is mounted to be swivellable about a frame-fixed transverse axis of the vehicle and which is supported fixed to a frame of said motorcycle via at least one of a spring device and a damper device.

11. A telescopically compressible wheel suspension according to claim 1, wherein said molded body is configured to take at least 75% of a volume of said interior space.

12. A telescopically compressible wheel suspension according to claim 1, further comprising said lubricant disposed in said interior space, wherein said molded body has a specific weight which is less than a specific weight of said lubricant.

13. A telescopically compressible wheel suspension according to claim 11, further comprising said lubricant disposed in said interior space, wherein said molded body has a specific weight which is less than a specific weight of said lubricant.

14. A telescopically compressible wheel suspension according to claim 1, wherein the molded body consists of aluminum.

15. A telescopically compressible wheel suspension according to claim 1, wherein said interior space for receiving a lubricant is defined by interior surfaces of said slide pipe and said standpipe.

16. A telescopically compressible wheel suspension according to claim 1, wherein said molded body is a closed hollow body.

17. A telescopically compressible wheel suspension for a front wheel of a motorcycle, comprising:
    a standpipe;
    a slide pipe, said slide pipe being telescopically slidable in said standpipe in an axial direction via a slide bearing, said standpipe and said slide pipe defining an interior space for receiving a lubricant; and
    a molded body disposed in said interior space, said molded body being a closed hollow body, wherein said molded body takes up at least 50% of said interior space.

18. A telescopically compressible wheel suspension according to claim 17, wherein the molded body consists of plastic.

19. A telescopically compressible wheel suspension according to claim 17, wherein said interior space for receiving a lubricant is defined by interior surfaces of said slide pipe and said standpipe.

20. A telescopically compressible wheel suspension according to claim 17, wherein said molded body takes up at least 75% of said interior space.

21. A telescopically compressible wheel suspension for a front wheel of a motorcycle, comprising:
- a standpipe;
- a slide pipe, said slide pipe being telescopically slidable in said standpipe in an axial direction via a slide bearing, said standpipe and said slide pipe defining an interior space for receiving a lubricant; and
- a molded body disposed in said interior space, said molded body being a closed hollow body, wherein said molded body has a specific weight which is less than a specific weight of said lubricant to be disposed in said interior space.

* * * * *